2 Sheets—Sheet 1.
P. H. JACKSON.
FLOOR, ROOF, OR AREA COVERING.
No. 10,921. Reissued Apr. 10, 1888.
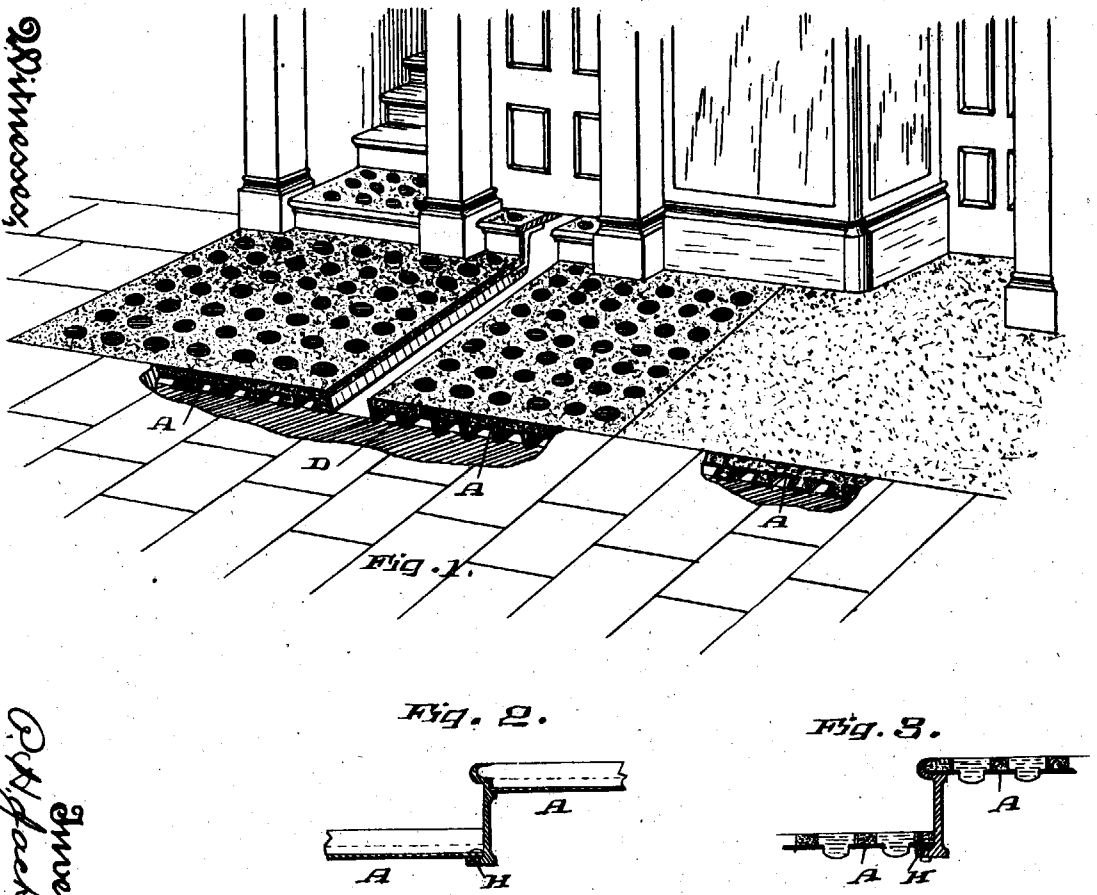
Witnesses,
Geo. H. Strong
J. H. Monroe
Inventor,
P. H. Jackson.
By Dewey & Co.
attys
THE NORRIS PETERS CO., WASHINGTON, D. C.

2 Sheets—Sheet 2.

P. H. JACKSON.

FLOOR, ROOF, OR AREA COVERING.

No. 10,921. Reissued Apr. 10, 1888.

Witnesses,
Geo. H. Strong.
J. B. Course.

Inventor,
P. H. Jackson.
By Dewey & Co.
Attys

THE NORRIS PETERS CO., WASHINGTON, D. C.

UNITED STATES PATENT OFFICE.

PETER H. JACKSON, OF SAN FRANCISCO, CALIFORNIA.

FLOOR, ROOF, OR AREA-COVERING.

SPECIFICATION forming part of Reissued Letters Patent No. 10,921, dated April 10, 1888.

Original No. 367,343, dated July 26, 1887. Application for reissue filed November 30, 1887. Serial No. 256,563.

*To all whom it may concern:*

Be it known that I, PETER H. JACKSON, of the city and county of San Francisco, State of California, have invented an Improvement in Floors, Roofs, and Area-Coverings; and I hereby declare the following to be a full, clear, and exact description of the same.

My invention relates to certain improvements in fire-proof floors, roofs, pavements, or area-coverings; and it consists of a surface of artificial stone or concrete, either with or without glass set therein for illuminating, together with corrugated metal plates or sheets, strengthening-bars, beams, metal straps, bent plates, or gratings, in connection with said plates, together with certain details of construction, all of which will be more fully explained by reference to the accompanying drawings, in which—

Figure 4:
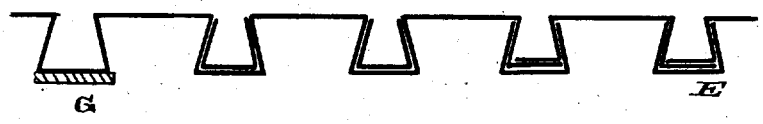
Figure 5:
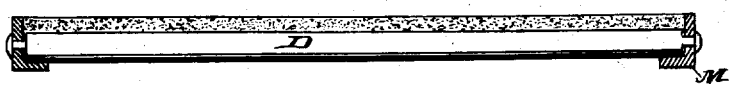
Figure 6:
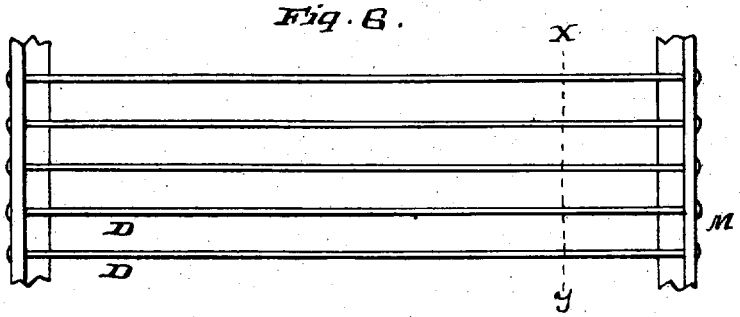
Figure 7:
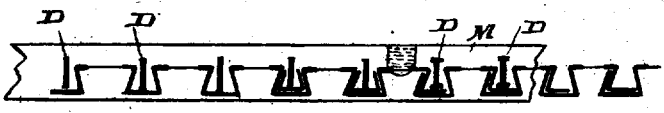

Figure 1 is a perspective view showing a building-front, the risers, and my improved pavement or area-covering. Figs. 2 and 3 are vertical sections showing my improvement with and without glass. Fig. 4 is an end section of the corrugated metal plates with corrugated strips fitting inside, and also showing a strip fitted outside of the corrugations, strengthening the same and to make the lap-joint water-tight. Fig. 5 is a longitudinal section showing the corrugated plates having the ends set in angle-iron. Fig. 6 is a plan of the same. Fig. 7 is a cross-section taken through X Y of Fig. 6, looking toward the right.

In my patent of March 31, 1885, No. 314,677, metallic supporting-beams are shown, which extend outward from the building and are fitted to support the ends of the corrugated plate or plates that extend between the beams. These corrugations, which form the strengthening-plate, extend across between beams and parallel with the building-front, the corrugated plates supporting a filling of artificial stone or concrete, the top of which forms the pavement or surface. These corrugated plates are usually perforated to receive thick glass, which serves to light the basement or area beneath. In practice I have found that the corrugations, which extend parallel with the building-front, as before stated, and which are of considerable depth to provide the necessary strength of plate, will cut off the light from the glass, which is fitted into the plates, so that it will not be thrown back into the basement as far as it should be on account of the depth of these ribs or corrugations.

Experience has shown that the person standing erect in an ordinary basement, twenty feet from the front, would be unable to see the glass, for the reason above described, and the rays of light would thus be cut off, so that the best effect is not produced.

The object of my present invention is to so construct the roof or covering that the light will not be cut off, and for that purpose I make the plates A with intermediate depressions or corrugations, which are extended down to a considerable depth, so as to give the greatest possible strength to the plates, which are made of heavy sheet metal, rolled or formed in the shape as shown. These plates are placed so that the corrugations or ribs extend outwardly, or at right angles from the front of the building, so that the ribs will not obstruct the plain portion of the plate in which the glass is set when glazing is employed. In order to strengthen the plates still further, I place vertical ribs of iron, D, in the corrugations, extending from end to end, and when the cement is filled in about them and upon the surface of the plate the whole is united and forms a rigid and solid pavement.

In Fig. 4 I have shown at E, on the right of the figure, the corrugations made dovetailed, with the widest portion at the bottom, and over these I have shown correspondingly-shaped angular plates, which are slipped on from the ends, so as to fit over these lap-joints and inclose them. The left central portion of this figure shows similar angular plates fitted inside of the corrugations, which are in this case made shaped as those shown at E, and are continuous without forming any lap-joint at that point. These supplemental plates, fitted in this manner, serve to greatly strengthen the corrugations, and the vertical longitudinal ribs may be left out, if desired, or they may be placed in the corrugations to give additional strength to the same. When the plastic compound of which the pavement is formed is forced into these dovetailed corrugations, it forms a strong lock and bond to hold the whole together and give it strength. In some cases these strips or bars may be secured upon the outside of the bottom of the corrugations, as shown at the extreme left of Fig. 4 at G, to give additional strength. The ends of the plates rest upon the bearers at the outer side of the area or space, and the inner ends rest upon the projecting flanges H at the bottom of the risers, as shown in Figs. 2 and 3.

In cases where the tiles, either with or without glass, are made in one piece and are to be used at a distance from the place of manufacture, I use a grating of bars extending through or parallel with the corrugations, and having end cross-bars riveted to them, as shown in Figs. 5 and 6, the end bars being made of angle-iron, with the bottom horizontal flange extending beneath the corrugated plate, as shown. By this means the bottom outer edges of the plates are protected from injury and the joints or laps of the corrugated iron are protected by the bent inclosing-strips which fit over the corrugations, as before described. In Fig. 5 this construction is shown in longitudinal section, the filling-in bar resting in grooves of the corrugations, and the angle-iron strips M at each end being riveted to the bars and also to the corrugated sheet, which rests upon the flange of the angle-iron extending beneath the corrugations. Fig. 6 shows a plan view of the same device, and Fig. 7 shows a cross-section of the plate and corrugations, looking toward the end, so as to show the flanged piece upon which the corrugated plates are supported, and also showing the strengthening-bars standing within the corrugations. By this construction I produce a support for the artificial stone or concrete filling which forms the surface of the sidewalk, this support having a resisting power much greater than will ever be brought upon it, and by extending the corrugations at right angles with the front of the building they make no obstruction to the light which passes through the glass, and I am thus enabled to very much increase the amount of light which is available within the basement.

Having thus described my invention, what I claim as new, and desire to secure by Letters Patent is—

1. In a sidewalk, area-covering, floor, or roof, the combination of corrugated metal plates having dovetailed corrugations extending lengthwise of the plate and supporting the sidewalk or surface composed of artificial stone or concrete, and bars, bearers, or strips of metal extending longitudinally within the corrugations, substantially as herein described.

2. In a sidewalk, area-covering, floor, or roof, corrugated metal plates with the corrugations extending lengthwise of the plate, so as to support the sidewalk or surface of cement, artificial stone, or concrete, in combination with strips of metal bent so as to fit the dovetailed corrugations either upon the exterior or interior, or both, substantially as herein described.

3. In a sidewalk, area-covering, floor, or roof, corrugated metal plates with the corrugations extending lengthwise of the plate, to support a sidewalk or surface composed of cement, artificial stone, or concrete, in combination with a metallic grating comprising the bars D, extending longitudinally within the corrugations, and angle-iron end bars, to which the bars D are riveted, extending across and beneath the ends of the plate, substantially as herein described.

4. In a sidewalk, area-covering, floor, or roof, corrugated metal plates having dovetailed corrugations extending lengthwise of the plate, in combination with a superposed surface or sidewalk of cement, artificial stone, or concrete, spread upon the plate and filling the corrugations, which act as a bond when employed, the corrugated plate at the bottom resisting the tensile strain, and the cement, artificial stone, or concrete above, which acts to resist the compressive force, substantially as described.

5. In a sidewalk, area-covering, floor, or roof, corrugated metal plates with the corrugations extending lengthwise of the plate without separate side beams or bearers, that portion of the plate between the corrugations being perforated to receive illuminating-glasses, in combination with a filling between the glasses of cement, artificial stone, or concrete, which is supported by the plate and fixed to the floor or surface, substantially as described.

6. In a sidewalk, area-covering, floor, or roof, corrugated metal plates with dovetailed or wedge-reversed-shaped corrugations extending lengthwise of the plate at the bottom, without separate side beams or bearers, that portion of the plate between the corrugations being perforated to receive illuminating-glasses, in combination with a filling between the glasses of cement, artificial stone, or concrete, which is supported by the plate and fixed to the floor or surface, substantially as described.

In witness whereof I have hereunto set my hand.

PETER H. JACKSON.

Witnesses:
S. H. NOURSE,
H. C. LEE.